United States Patent Office 3,530,003
Patented Sept. 22, 1970

3,530,003
COMPACT FUEL CELL BATTERY
Bernard Warszawski, Paris, and Bernard Verger, Palaiseau, France, assignors to Societe Generale de Constructions Electriques et Mecaniques (Alsthom), Paris, France, a corporation of France
Filed Feb. 26, 1968, Ser. No. 708,225
Claims priority, application France, Feb. 24, 1967, 2,734
Int. Cl. H01m 27/00
U.S. Cl. 136—86                                           7 Claims

ABSTRACT OF THE DISCLOSURE

A fuel cell battery is formed of an assembly of parallel, stacked thin plates including electrode and diaphragm elements, with insulating spacer frames interposed between the electrodes and the diaphragms; the electrode and diaphragms are fitted into windows cut into their holding elements; the spacer frames have marginal portions extending in slightly overlapping relation over the electrodes and diaphragms, and being formed with openings to provide for electrolyte supply ducts. Three spacer frames are interposed between an electrode and a diaphragm, each, and the central one is formed with additional communicating channels, to introduce electrolyte from the supply ducts formed by the stacked openings to the space between an electrode and a diaphragm.

---

The present invention relates to fuel cells, and more particularly to an assembly of fuel cells to form a battery, which is built up of stacked fuel cell units.

Fuel cell batteries have been built in which fuel cell units are stacked in repetitive sequence to form a battery assembly. Essentially, the fuel cell elements are in flat, or sheet form, and include a semi-permeable diaphragm and electrode elements, the diaphragm separating each fuel cell into two half-cells. The diaphragms and electrodes are held in frames. Each one of the half-cells has an electrolyte applied thereto, for example by providing ducts in the marginal areas of the stacked frames. Supply channels, or grooves are formed in some of the elements to provide for a path of the electrolyte from the ducts to the face of the electrodes.

Assembly of such batteries makes it necessary that all the sheet-elements are cut, pierced, or stamped similarly in order to provide for connecting supply ducts. Such cutting is particularly difficult when the electrodes are formed of plastic material which is made conductive by being charged with a conductive material, and if the semi-permeable diaphragms are ion exchange membranes. The difference in material requires different stamping techniques. Additionally, the ion exchange membrane may deform, when locked into an assembly, and thus partly obstruct the openings punched therethrough, or electrolyte supply ducts provided therein, thus interfering with proper circulation of electrolyte, and thus operation of the battery.

It is an object of the present invention to provide a fuel cell battery which does not require complicated manufacturing processes.

SUBJECT MATTER OF THE PRESENT INVENTION

Briefly, a fuel cell battery in accordance with the present invention is built up as a repetitive stack of diaphragms such as ion exchange membranes, and electrodes, with spacer frames holding the membranes and electrodes in place. The spacer frames have a central window, facing the active area of the electrodes, and a wide marginal portion. The spacer frames are preferably of insulating material. The marginal portions are wide enough to extend beyond, at the outside, the margins of the electrodes and the diaphragms. These marginal portions are then pierced, or formed with transverse openings which, when the frames are stacked together, provide the electrolyte supply ducts. The diaphragms and electrodes fit in the window opening of holding frames having an outer outline similar to that of the spacer frames.

Some of the elements, preferably the spacer frames, are formed with interconnecting notches, grooves or channels, which connect from the transverse openings to the central window of the frames to provide for supply of electrolyte to the space between an electrode and an ion exchange membrane.

In accordance with a preferred feature of the invention, and one providing enhanced electrical insulation, three spacer frames are provided, only the central one of which is formed with the electrolyte channels, which connect the electrolyte ducts to the central window. The first and third frame then secure the semi-permeable diaphragm, and the electrode in position.

The central window of the spacer and of the holding frames may have any convenient form, for example square, rectangular, circular, or the like, and does not require any special cutting tool for its manufacture. The electrodes and diaphragms will have a similar shape; the holding frames will be a solid outer frame, thus no special cutting or forming step after original manufacture of the electrodes or diaphragms is required. The spacer and holding frames, if made of plastic, can readily be worked. The electrolyte supply grooves or channels are thus placed in a material which will not deform under manufacturing processes. The spacer frames serve as locking members for the peripheral portions of the electrodes and diaphragm holding frames placed therebetween. The electrode and diaphragm holding frames can be made to be sufficiently rigid in order to retain the central, active portion of diaphragms in position, and additionally reduce electric leakage paths along the electrodes or the semi-permeable diaphragms.

The construction according to the invention provides an assembly, the outside of which is exclusively formed by frames, of insulating material, so that the entire assembly can be held together directy by bolts placed into holes drilled through the frames. The entire assembly can thus be easily tightened without requiring additional insulation of locking bolts, which previously made assembly of a plurality of cells, and their accurate placement more difficult. The unsightly, and space-consuming construction of placing locking bolts at the outside of the assembly is entirely avoided. Additionally, porous elements within the battery are entirely contained therein, and will not extend to any accessible edge thereof.

The structure, organization, and operation of the invention will now be described more specifically with reference to the accompanying drawings, in which.

Figure 1:
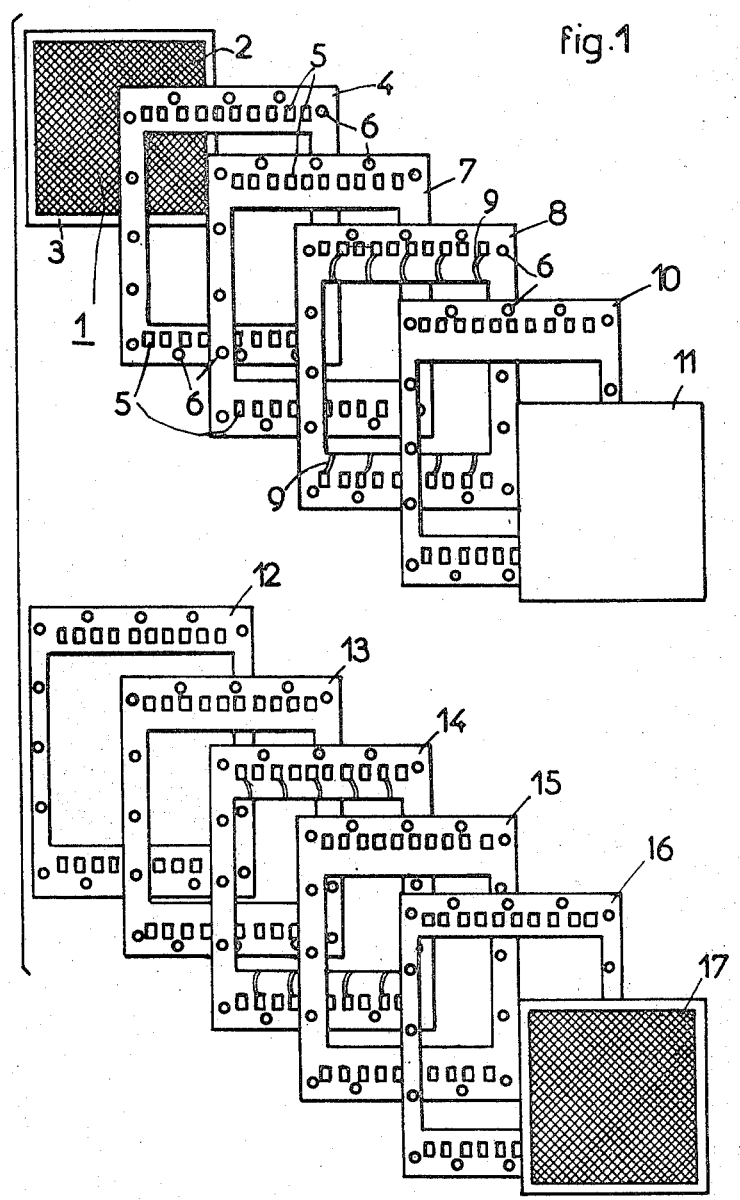
FIG. 1 is a perspective, exploded view, in two parts, of the various elements forming a fuel cell assembly.

Referring now to the drawings, and more particularly to FIG. 1, which illustrates, in sequence, the elemental units of a fuel cell battery which, when assembled in repetitive sequence, form an entire battery: An electrode 1, of conductive material, has a central, active portion 2. The active portion is generally square, and may be porous, mesh, or lattice, and made for example of metallic gauze, or fabric, of expanded metal, or embossed metal sheet. At its outside is a flat, thin marginal portion 3. The central portion 2 is set into a central window of a frame 4, of insulating material. Frame 4 is pierced at its edge portions to form two rows of openings 5, which, when assembled with similar other frames, form supply and removal ducts for the electrolyte. Additionally, edge holes 6 are provided for locking bolts to lock the entire assembly together.

Electrode 1 is thus held in frame 4. Against the so-retained electrode, a frame 7 of insulating material is placed, likewise pierced with holes 5 and 6, matching the holes in frame 4. Frame 7 has an interior window, the marginal portion surrounding and slightly overlapping the window, of frame 4, and fitting against frame 4. Another frame 8, likewise of insulating material, is placed against frame 7. Frame 8 has the same general outline, and the same openings 5, 6 therein as frames 4 and 7. In addition, it has slits or grooves or notches 9, which interconnect openings 5 with the central window. These slits or grooves 9 are so arranged that they interconnect only every other opening 5 with the central window; a spacer frame 14 (lower portion of FIG. 1) then connects the alternate channels. As shown, the first, third, etc. (odd numbered) opening 5 at the lower row, is connected by grooves 9, whereas the evenly numbered openings 5 in the upper row connect to the central window; whereas in frame 14 the reverse relationship prevails—at the lower row the even numbered openings connect with the central window, and at the upper row the odd numbered openings connect with the central window. Normally, the upper rows will be the supply ducts, for example, supplying through the even-numbered openings electrolyte with a reducing-type reactant added, and supplying through the odd-numbered ducts electrolyte with an oxidizing-type reactant added. The withdrawal of electrolyte is then through the odd (or even, respectively) numbered ducts. Frames 8 and 14 can thus be made in one manufacturing operation, frames 8 and 14 being merely reversed by 180° about the main axis of the battery, with respect to each other. The central window again has the same outline as the active surface of the electrode 1, that is of the porous, mesh, or embossed region 2.

The frame 10, identical to frame 7, is stacked between frame 8 and a diaphragm 11. Diaphragm 11, which may be an ion exchange membrane, is semi-permeable, and comprises a generally square, central portion of the same shape and size as electrode 1. Diaphragm 11 is recessed into frame 12 which is identical to frame 4, previously described. It is to be understood that the entire arrangement is coaxial, the staggered showing being merely for purposes of convenience of graphic representation. A frame 13, identical to frame 7, follows next; a frame 14, identical to frame 8, but turned 180° with respect thereto is placed against frame 13. Frame 15 is identical to frame 7. The final frame 16 is again identical to frame 4, and element 17 is another electrode, identical to electrode 1.

The thickness of the various elements is such that the diaphragm 11 bears against protuberances or projections, or expanded mesh or lattice structures of the active portion 2 of electrode 1. The thickness of frame 4 is the same as that of the electrode frame 3; similarly, the thickness of frame 12 is the same as that of diaphragm 11. By making the outside of electrode 1 and diaphragm 11 identical, the frames 4 and 12 can be made on a single punching machine.

Figure 2:
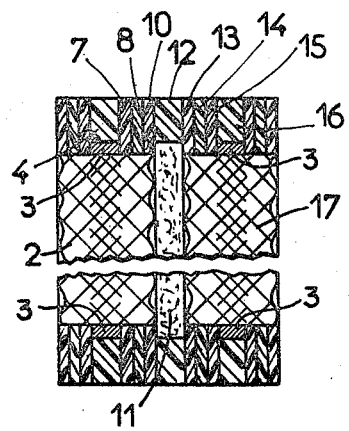
FIG. 2 is a vertical cross-sectional view of a unit cell of a battery.

FIG. 2 illustrates a vertical cross-sectional view in which the thicknesses of the various materials are greatly exaggerated. The showing of the longitudinal openings has been omitted for purposes of clarity, as well as the illustration of slits 9.

Figure 3:
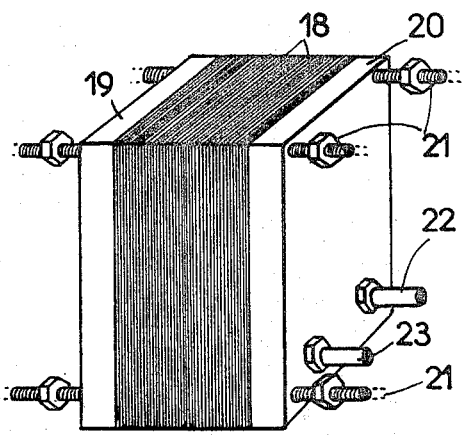
FIG. 3 is a perspective view of an assembled battery.

The entire assembly of the group of such elementary fuel cells (electrodes 2 and membrane 11 forming a half-cell) is best seen in FIG. 3, where a group of elementary half-units are stacked into one whole. The various elements are locked against each other by terminal plates 19, 20, and bolts 21 passing through holes 6 of the components (FIG. 1); only three bolts are shown for simplicity in the drawing. Electrolyte is introduced through pipe stubs 22, 23, and internal distribution channels can be formed in blocks 19 and 20 so that electrolyte of one type is conducted only to evenly numbered ducts 5, and electrolyte of opposite type to odd numbered ducts 5. Similar pipe stubs can be connected to terminal plate 19 for drainage of spent electrolyte, and not shown in the drawings for simplicity.

The present invention has been described only in connection with a simple example. It is to be noted that, from an electrical point of view, the presence of the frames 7, 10, 13 and 15 presents a substantial impediment for spurious paths of electricity. The slits 9 are limited, at all of their sides, by insulating material of adjacent frames, and spurious electrical paths, even along the narrow slits, present a large resistance. Additionally, since the entire outer circumference of the cell, see for example FIG. 3, is plastic material, no insulation problem arises, with respect to ambient surroundings. Additionally, the plastic frames 12 completely surround the semi-permeable membranes, so that the outside of the battery only presents impervious and inert plastic material and leakage of any fluids to the outside is avoided.

Various structural changes and modifications, as determined by the requirements of particular applications or uses may be made without departing from the inventive concept.

We claim:

1. Fuel cell battery formed of a plurality of stacked, thin sheet-like elements, said elements including semi-permeable diaphragms and electrodes, opposed sides of said diaphragms facing different electrodes, one side and one electrode defining an individual half-cell;

holding frames having peripheral portions defining, therebetween, windows surrounding said diaphragms and electrodes, said semi-permeable diaphragms and electrodes fitting within the window of associated holding frames;

spacer frames of insulating material interposed between the holding frames for said electrodes and diaphragms, said spacer frames having peripheral portions defining a central window, the peripheral portions of the spacer frames having an inner periphery in contact with the side portions of said elements and overlapping and surrounding said side portions;

the peripheral portions of said spacer frames and of said holding frames being formed with transverse openings therethrough to provide, when stacked, electrolyte supply and drainage ducts;

connecting channels extending from said ducts and formed in the peripheral portions of at least one of said frames for each half cell to provide for supply of electrolyte to each half cell;

and means releasably securing said frames with said elements secured therebetween together in stacked relation.

2. Battery according to claim 1 wherein three spacer frames are placed between each electrode and semi-permeable diaphragm half-cell combination, the central one of said spacer frames being formed with said connecting channel and extending from said opening to the window to provide for supply of electrolyte to the half-cell.

3. Battery according to claim 1 including terminal plates, stacked at the outside of the fuel cell battery, and fluid connection means interconnecting said electrolyte supply and drainage ducts.

4. Battery according to claim 3 including additional openings formed through said end plate and through said spacer frames; said releasable securing means comprising locking bolts passed through at least some of said additional openings to lock the stacked assembly together.

5. Battery according to claim 1 wherein said spacer frames are of insulating materials.

6. Battery according to claim 1, wherein the spacer frames having said connection channels are similar, the frames at opposite sides of said electrodes being turned with respect to each other by 180° about the major axis of the battery.

7. Battery according to claim 1 wherein similarly located peripheral portions of all said spacer frames are of the same size to define windows of a size similar to the active electrode areas.

References Cited

UNITED STATES PATENTS 3,278,336  10/1966  Uline et al. _____ 136—86

FOREIGN PATENTS 1,399,765  4/1965  France.

ALLEN B. CURTIS, Primary Examiner